(12) United States Patent
Locker et al.

(10) Patent No.: US 11,343,864 B2
(45) Date of Patent: May 24, 2022

(54) DEVICE PAIRING

(71) Applicant: Lenovo (Singapore) Pte. Ltd., Singapore (SG)

(72) Inventors: Howard Locker, Cary, NC (US); Xin Feng, Morrisville, NC (US); Paul Hilburger, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 651 days.

(21) Appl. No.: 14/261,992

(22) Filed: Apr. 25, 2014

(65) Prior Publication Data
US 2015/0312951 A1    Oct. 29, 2015

(51) Int. Cl.
| H04W 4/00 | (2018.01) |
| H04W 76/14 | (2018.01) |
| H04W 4/80 | (2018.01) |
| H04M 1/72412 | (2021.01) |
| H04W 84/18 | (2009.01) |

(52) U.S. Cl.
CPC ....... *H04W 76/14* (2018.02); *H04M 1/72412* (2021.01); *H04W 4/80* (2018.02); *H04W 84/18* (2013.01)

(58) Field of Classification Search
CPC ........... G06F 3/017; G06F 3/005; G06F 21/31
See application file for complete search history.

(56) References Cited

U.S. PATENT DOCUMENTS

| 9,529,439 B2* | 12/2016 | Van Dyken | G06F 3/017 |
| 2006/0037038 A1* | 2/2006 | Buck | G06F 3/013 725/9 |
| 2006/0282649 A1* | 12/2006 | Malamud | H04L 63/0861 712/26 |
| 2009/0219386 A1* | 9/2009 | Ebisawa | A61B 3/11 348/78 |
| 2010/0029305 A1* | 2/2010 | Gupta | G01C 21/20 455/466 |
| 2010/0245585 A1* | 9/2010 | Fisher | H04M 1/6066 348/164 |
| 2011/0070827 A1* | 3/2011 | Griffin | H04B 5/02 455/41.1 |
| 2011/0314168 A1* | 12/2011 | Bathiche | H04W 4/21 709/228 |
| 2012/0026191 A1* | 2/2012 | Aronsson | G02B 27/017 345/633 |

(Continued)

*Primary Examiner* — Mahelet Shiberou
(74) *Attorney, Agent, or Firm* — Ference & Associates LLC

(57) ABSTRACT

An embodiment provides a method, including: receiving data relating to a first command from a user; recognizing the data relating to the first command as being directed to a first user device; receiving data relating to a second command from a user; recognizing the data relating to the second command as being directed to a second user device; determining that the first user device and the second user device are to be paired with one another based on the data relating to the first command and the data relating to the second command; and pairing the first device with the second device; wherein one or more of the data relating to the first command and the data relating to the second command comprises data related to a non-touch input modality. Other aspects are described and claimed.

16 Claims, 4 Drawing Sheets

(56) References Cited

U.S. PATENT DOCUMENTS

| | | | | |
|---|---|---|---|---|
| 2012/0081282 A1* | 4/2012 | Chin | .................. | G06F 21/32 |
| | | | | 345/156 |
| 2012/0083208 A1* | 4/2012 | Giles | ................ | G06F 13/387 |
| | | | | 455/41.2 |
| 2012/0083209 A1* | 4/2012 | Giles | ................ | H04W 4/206 |
| | | | | 455/41.2 |
| 2012/0124456 A1* | 5/2012 | Perez | .................. | G06Q 30/02 |
| | | | | 715/200 |
| 2013/0169526 A1* | 7/2013 | Gai | .................. | H04W 4/008 |
| | | | | 345/156 |
| 2013/0169550 A1* | 7/2013 | Gai | ................ | G06F 3/041 |
| | | | | 345/173 |
| 2013/0169571 A1* | 7/2013 | Gai | ................ | G06F 3/03547 |
| | | | | 345/173 |
| 2013/0191789 A1* | 7/2013 | Calman | .............. | G06F 3/017 |
| | | | | 715/863 |
| 2013/0229569 A1* | 9/2013 | Bevirt | ............... | F16M 11/12 |
| | | | | 348/373 |
| 2014/0088922 A1* | 3/2014 | Messenger | ........ | A63B 24/0062 |
| | | | | 702/189 |
| 2014/0096076 A1* | 4/2014 | Ashbrook | ........... | G06F 3/0481 |
| | | | | 715/808 |
| 2016/0063326 A1* | 3/2016 | Yamashita | ........ | G06K 9/00604 |
| | | | | 348/78 |
| 2019/0327775 A1* | 10/2019 | Ko | ................ | H04N 21/4108 |

\* cited by examiner

DEVICE PAIRING

BACKGROUND

Improvements have been seen in capabilities for affording intercommunication and sharing between electronic devices. As such, devices can be paired for "peer to peer" transfer of data via wireless or other connections. Device pairing via "Bluetooth®", e.g., between a mobile phone and an earpiece, emerges as but one example. ("Bluetooth®" is a registered trademark of the Bluetooth Special Interest Group in the United States and other jurisdictions.)

Generally, device pairing has still mainly involved complex and non-intuitive processes, requiring the use of special applications, and/or of some degree of knowledge, learning or work on the part of a user. Some solutions have made strides by permitting a simple action to pair devices. One example is Near Field Communication (NFC), which permits device pairing simply by bumping two devices (e.g., two mobile phones) against one another. However, such solutions tend only to work once a complex application has been installed in both devices, which may not be a universally viable measure to undertake.

BRIEF SUMMARY

In summary, one aspect provides a method, comprising: receiving data relating to a first command from a user; recognizing the data relating to the first command as being directed to a first user device; receiving data relating to a second command from a user; recognizing the data relating to the second command as being directed to a second user device; determining that the first user device and the second user device are to be paired with one another based on the data relating to the first command and the data relating to the second command; and pairing the first device with the second device; wherein one or more of the data relating to the first command and the data relating to the second command comprises data related to a non-touch input modality.

Another aspect provides an apparatus, comprising: a processor; and a memory that stores instructions executable by the processor to: receive data relating to a first command from a user; recognize the data relating to the first command as including a pairing command directed to a first user device; receive data relating to a first command from a user; recognize the data relating to the first command as being directed to a first user device; receive data relating to a second command from a user; recognize the data relating to the second command as being directed to a second user device; determine that the first user device and the second user device are to be paired with one another based on the data relating to the first command and the data relating to the second command; and pair the first device with the second device; wherein one or more of the data relating to the first command and the data relating to the second command comprises data related to a non-touch input modality.

A further aspect provides a product, comprising: a storage device having code stored therewith, the code being executable by a processor and comprising: code that receives data relating to a first command from a user; code that recognizes the data relating to the first command as being directed to a first user device; code that receives data relating to a second command from a user; code that recognizes the data relating to the second command as being directed to a second user device; code that determines that the first user device and the second user device are to be paired with one another based on the data relating to the first command and the data relating to the second command; and code that pairs the first device with the second device; wherein one or more of the data relating to the first command and the data relating to the second command comprises data related to a non-touch input modality.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
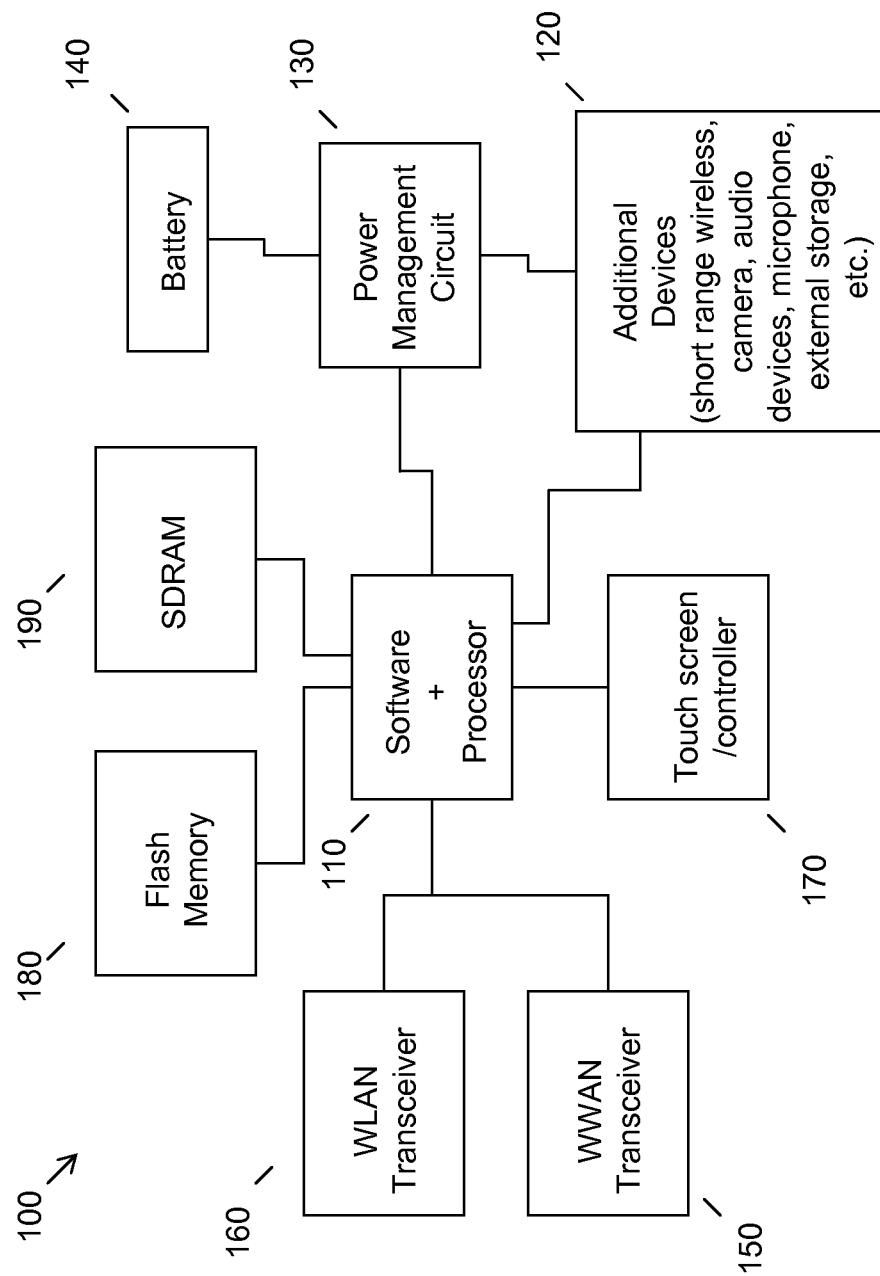
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Broadly contemplated herein, in accordance with embodiments, are simple, intuitive processes for device pairing. In some embodiments, there is no requirement for the installation of specialized components as these embodiments may make use of existing hardware in the devices. Such pairing may thus be brought about by manual or user-initiated assistance or intervention, in a manner to be understood and appreciated more fully below.

By way of example, cameras are being integrated into many devices and may serve as an input modality useful in pairing. Other non-camera example pairing input modalities will be described throughout as well. For camera input, particularly for cameras having a wide field of view, it may be determined what the user is looking at by "eye tracking" or "eye gazing", e.g., using a single device (e.g., a notebook or monitor) that can see the entire room or utilizing multiple devices with cameras in the same room, e.g., each with a different perspective of the user.

Using the camera information, it is possible to determine exactly what a user is looking at, e.g., it is possible to track which device the user is looking at or focusing on. An embodiment uses such data to facilitate pairing of devices by utilizing such input as a trigger for pairing devices. For example, an embodiment may define a gesture where a user looks at the first device that he or she wants to pair, e.g., for a set period of time.

Once this is done the device may notify the user it is ready for pairing, e.g., it has been activated. This notification may take a variety of forms, e.g., the notification may be an audible sound if the device is simple like an ear bud or mouse. The notification may be a visual indicator, e.g., if the device is more complex, such as a smart phone or notebook computer.

Then the user does a predetermined gesture (e.g., the same gesture) within a set amount of time (e.g., according to a predetermined policy) at the second device that is to be paired with the first device. Once this is completed, each device contains information that allows it to be paired with the other device having like information. A notification may also be given of the successful pairing.

An example way that pairing may be accomplished includes, in one non-limiting example, having each device, e.g., at a prior time such as at time of manufacture, registered in a cloud or other network service with a unique identifier. Assuming each device has a way of sending information to the cloud (Internet of things) after detecting the gesture/pairing command directed thereto, then responsive to gesture detection for pairing, each device may be identified as the other pairing device. This may be facilitated or accomplished using the cloud service (or other network connection). This frees the user from needing to rely on proximity and manual input/selection for pairing devices.

For example, each device may send its pairing gesture detection (or raw data relating to the same) as output to the cloud at which point the cloud processes the detected gestures (or processes the video stream or camera data to detect the gestures) and makes the determination of which devices the user wants to pair. As each device has already sent their information to the cloud it is a simple for the cloud to put a "flag" under the device the user selected for pairing. If another "flag" appears within the set amount of time, there will be a matched pair, and the cloud may then transmit data to the devices for pairing, e.g., the correct pairing information may be sent to both devices. If no such match is made, the first flag may expire at a predetermined time.

As will be understood from this description, gesture detection may be done using multiple devices, e.g., within a room that has camera(s) available. The gesture detection may also be accomplished locally, i.e., on the device to be paired. Additionally, it will be understood that a variety of devices may be involved and that a variety of input modalities may be used to pair devices, even if a device to be paired does not have a convenient input modality for detecting a pairing command such as a gesture or voice input.

The illustrated example embodiments will be best understood by reference to the figures. The following description is intended only by way of example, and simply illustrates certain example embodiments.

Figure 2:
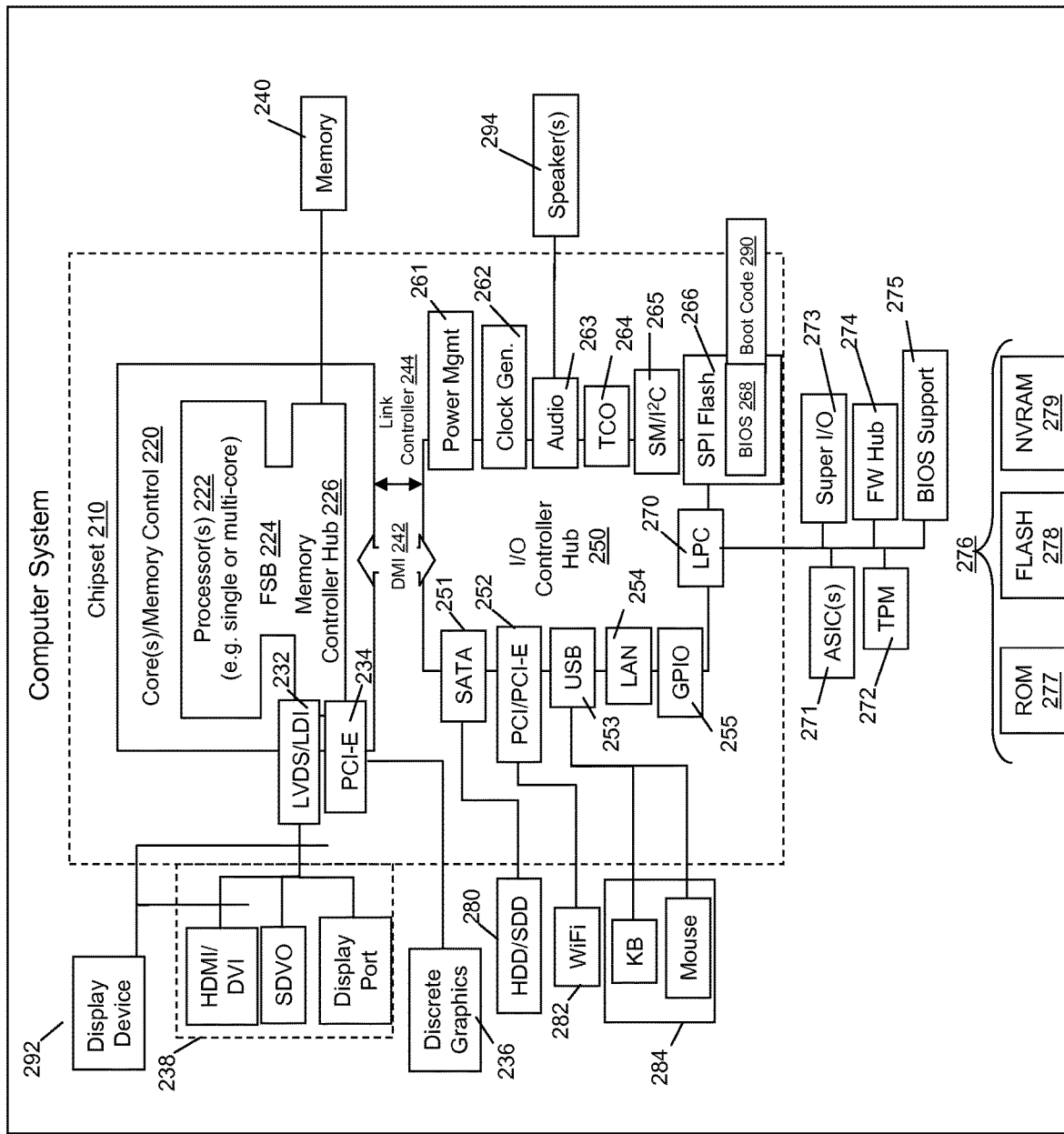
FIG. 2 illustrates another example of an information handling device.

FIGS. 1 and 2 relate to electronic components that may be included in mobile computing platforms and/or laptop computers. It should be understood and appreciated that components illustrated and described with respect to FIGS. 1 and 2, and aspects of the circuitry involved, may also be found and utilized in desktop computer systems and/or CPUs thereof, which themselves may serve as a context for embodiments as broadly contemplated herein.

While various other circuits, circuitry or components may be utilized in information handling devices, an example illustrated in FIG. 1 includes a system design found for example in tablet or other mobile computing platforms. Software and processor(s) are combined in a single unit 110. Internal busses and the like depend on different vendors, but essentially all the peripheral devices (120) may attach to a single unit 110. The circuitry 100 combines the processor, memory control, and I/O controller hub all into a single unit 110. Also, systems 100 of this type do not typically use SATA or PCI or LPC. Common interfaces for example include SDIO and I2C.

There are power management circuits(s) 130, e.g., a battery management unit, BMU, which manage power as supplied for example via a rechargeable battery 140, which may be recharged by a connection to a power source (not shown). In at least one design, a single unit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are also commonly included. Commonly, system 100 will include a touch screen/controller 170 for data input and display. System 100 also typically includes various memory devices, for example flash memory 180 and SDRAM 190.

FIG. 2, for its part, depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a set 210 (a group of integrated circuits, or chips, that work together) with an architecture that may vary depending on manufacturer (for example, INTEL, AMD, ARM, etc.). INTEL is a registered trademark of Intel Corporation in the United States and other jurisdictions. AMD is a registered trademark of Advanced Micro Devices, Inc. in the United States and other jurisdictions. ARM is a trademark of ARM Holdings plc in various jurisdictions.

The architecture of the set 210 includes a core and memory control group 220 and an I/O controller hub 250 that exchanges information (for example, data, signals, commands, et cetera) via a direct management interface (DMI) 242 or a link controller 244. In FIG. 2, the DMI 242 is an interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a unit that supplants the conventional "northbridge" style architecture.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, 280, etc.), a PCI-E interface 252 (for example, for wireless connections 282), a USB interface 253 (for example, for devices 284 such as a digitizer, keyboard, mice, cameras, phones, microphones, sensors, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Generally, it can be appreciated that conventional device pairing has become a specialized and non-intuitive task. For instance, conventionally in order to pair a mobile phone (e.g., smartphone) with another device, a Bluetooth® (or related) capability of the phone needs to be activated (e.g., through a series of touchscreen entries on the phone), at which point the associated utility or application in the phone searches for a device with which to be paired (e.g., an earpiece or a vehicle hands-free communication system). This is followed by a menu selection and commonly a pin code entry.

By way of another example, while hard-wired and wireless connections can be used to pair a computer with a television set, several commands typically need to be entered into the computer at least for initial setup. Generally, while automatic pairing between two devices conventionally can be set to take place at any time after initial setup of a pairing arrangement and when two devices are turned on and in close proximity, this tends to rely solely on proximity and on automatic recognition of solely one channel (e.g., a WiFi channel) through which the devices are to be paired.

Figure 3:
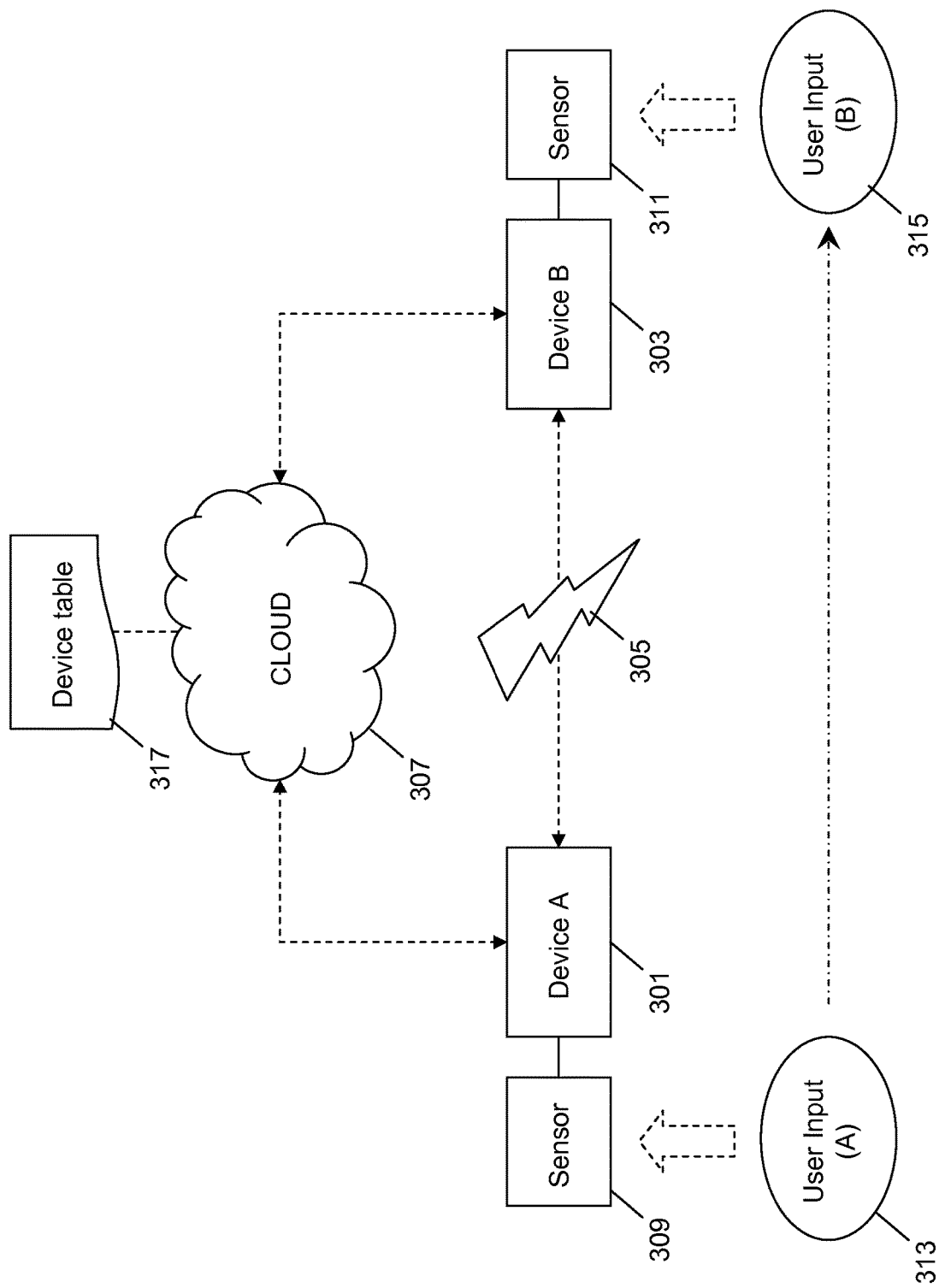
FIG. 3 schematically illustrates an arrangement for pairing two devices.

FIG. 3 schematically illustrates an arrangement for pairing two devices according to an example embodiment. Thus, in an embodiment, two devices, Device A (301) and Device B (303) are included in a pairing scenario. By way of illustrative example, Device A (301) could be a tablet or laptop computer on the second floor of a house and Device B (303) could be a television set on the first floor of a house.

In accordance with this example, the devices (301/303) can be paired such that data (including pictures and sound) can be streamed from a computer, e.g., Device A 301, to a television 303. It should be understood that a great variety of possible devices may be paired in accordance with embodiments broadly described and contemplated herein; merely by way of illustrative example, such devices could include, but need not be limited to: a laptop, tablet or desktop computer; a television; a satellite radio unit; a mobile phone or smartphone; a voice-based communication system in an automobile; or even simple devices such as a BLUETOOTH ear bud (i.e., devices not having complex user interfaces).

In embodiments, pairing between Devices A and B (301/303) may take place in a variety of ways. In one embodiment, in establishing a pairing using, e.g., a local wireless network connection (e.g., WiFi or "Bluetooth®" network) 305 in order to facilitate data transmission between the two devices (301/303), pairing can involve the devices (301/303) transmitting data to a separate arrangement such as a cloud structure 307 (or, "the cloud"), for subsequent sharing with the other one of the devices (301/303).

In an embodiment, each device 301/303 includes (or is in communication with) a sensor (309 and 311, respectively) configured for receiving user input by way of helping activate a pairing state between the devices 301/303. In an embodiment, such input may be in the form of an audible manual gesture such as a clapping of the hands, or snapping (e.g., one or two times), or by looking at the device to be paired. The user thus provides such input (313) for detection by sensor 309 and then proceeds to a vicinity of Device B (303). Here, the user repeats the gesture (e.g., clapping of the hands) (315) for detection by sensor 311.

Pairing of the two devices 301/303 will thereby be activated once the user has provided input in this manner for both sensors 309/311, as indicated at 313 and 315, respectively. In an embodiment, a device table 308, associated with a user account, is hosted by the cloud 307. Once the user provides input at a first one of the devices (301/303) to initiate pairing, a first device ID (e.g., a unique device identifier that is registered in the cloud 307 upon manufacture) is transmitted to the device table 308. Similarly, a second device ID is transmitted to the device table 308 once the user provides input a second one of the devices (301/303) to complete pairing. In a variant embodiment, all device IDs associated with a user may already be listed in a table while a "flag" or other indicator is activated in the list for each device that a user selects for paring. This allows for a service (e.g., cloud service in communication with devices 301, 303) to match or identify which devices are to be paired.

In an embodiment, a time limit can be pre-established (e.g., in connection with device table 308) in order for the user to provide activating input (for device pairing) at the second device (at 315) after providing it at the first device (at 313). By way of illustrative example, such a time limit can be set at 30 seconds or one minute. If pairing (or providing of the pairing input at the devices) is not completed within the pre-established time limit, the devices may not be paired. Alternatively, there may be no time limit for pairing such that pairing may be accomplished in a disjointed fashion with respect to time.

In accordance with variant embodiments, user-initiated gestures other than clapping may be employed in order to activate device pairing. In one embodiment, sensors 309 and 311 may be embodied by cameras configured to detect a gesture undertaken by a user's eyes (e.g., back and forth movement of the eyes, blinking, or a determination that a user has looked towards the device for a predetermined period of time). In another embodiment, sensors 309 and 311 may be embodied by modules or utilities configured for speech recognition. Here, voice-based commands (e.g., "start pairing" and "finish pairing") can be uttered by a user to initiate and complete pairing at the devices 301/303.

In an embodiment, one or more additional security measures may be incorporated to ensure that commands to start or initiate pairing only originate from one or more predetermined users. By way of example, in embodiments where one or more of the sensors 309/311 includes a camera, such measures can involve iris recognition or facial recognition. By way of another example, in embodiments involving speech recognition with one or more of the sensors 309/311, voice identification can be employed to ensure that an authorized user is making commands.

In an embodiment, one or more notifications may be provided to the user with respect to the progress of some or all of the pairing process. For example, once the cloud service provides pairing data to the identified devices, and these devices complete an automated pairing protocol to pair with one another, the user may receive a visual or auditory confirmation that the devices have been successfully paired. Similarly, a notification or confirmation may be provided at Device A (301), e.g., a displayed message such as "Pairing Initiated", to indicate that the user's initiation of the pairing process was successful (e.g., a gesture or pairing command was received and identified at Device A). In an embodiment, the user may receive similar confirmation at Device B (303) and/or another notification, e.g., to indicate that completion of the pairing process was successful (e.g., a displayed message such as "Pairing Completed").

It should be understood and appreciated that, in embodiments broadly contemplated herein, additional code associated with (e.g., installed in) the devices 301/303 and/or sensors 309/311 may be used to facilitate detection and processing of user commands or gestures as broadly described herein. However, a similar or analogous function may also be undertaken via a utility associated with (e.g., hosted at) the cloud 307 or elsewhere.

In an embodiment, there may be more than two physically proximate devices that a user may select for pairing, possibly even in the same room. In such an instance, pairing may be undertaken in favor of those devices for which auditory or visual commands are detected to be the strongest or most direct. By way of example, in the case of sensors embodied by cameras, pairing may be initiated or completed on behalf of a device towards which a user looks (or "gazes") directly for a predetermined period of time (e.g., two or three seconds).

It should be understood and appreciated that, in an embodiment, sensors 309/311 each need not necessarily be disposed in close proximity to the devices (301/303, respectively) with which they are associated. Thus, a sensor may be disposed in a different location from the device on behalf of which it is sensing, and the sensor and device may otherwise be in communication via a hard-wired or wireless link. Thus, for devices that lack a sensor for detecting a pairing command, e.g., an ear bud, a sensor of another device, e.g., smart phone camera, etc., may be utilized to receive the pairing command, determine (for example, using eye tracking) that it is directed to the other device (e.g., ear bud) and facilitate communication of the same, e.g., to a cloud service, for processing and pairing.

It should also be understood and appreciated that, in an embodiment, essentially any suitable physical gesture other than direct physical contact with an object may be employed to forward a command to initiate or complete pairing of two devices. Such a gesture, among many others, can include hand movement, hand clapping, eye orientation or eye movement. Thus, in such an embodiment, a user need not type a command into a device (or other object), or push a button or press a touch screen on a device (or other object) in order to initiate or complete pairing of two devices.

Additionally, it should be understood and appreciated that, in an embodiment, essentially any suitable auditory command may be employed to forward a command to initiate or complete pairing of two devices. Such a command, among many others, can include a voice command.

In accordance with at least one embodiment, "hand clapping" may be understood herein to represent a physical gesture, an auditory command, or both.

Figure 4:
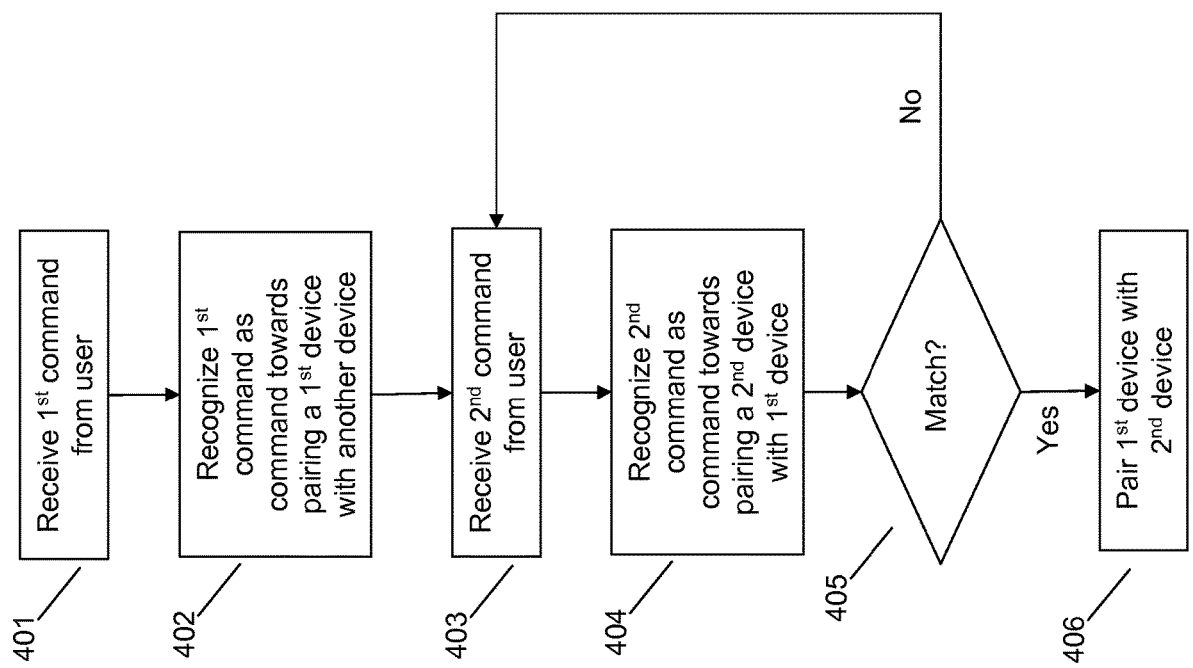
FIG. 4 illustrates an example method of pairing two devices.

Referring to FIG. 4, an embodiment may serve to pair two devices. An embodiment may receive a first command from a user (401), and recognize the first command as a command directed towards pairing a first device with another device (402). An embodiment may receive a second command from a user (403), and recognize the second command as a command directed towards pairing the second device with the first device (404). An embodiment may pair the first device with the second device (406), e.g., responsive to determining there is a matched pair at 405 between devices identified by the cloud service as belonging to the particular user and having received a pairing command within a predetermined time. If there is not a match determined at 405, an embodiment may await a pairing command at another device. In an embodiment, at least one of the first and second commands comprises at least one of: a physical gesture other than direct physical contact with an object; and an auditory command. Conveniently, the commands may be sensed using a non-touch input modality such as camera based gesture sensing and audio input sensing.

It should be appreciated and understood that a great number of variants are conceivable in addition to those embodiments otherwise discussed and broadly contemplated herein.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    receiving, at a network device comprising a cloud device, a first user input command recognized as being directed to a first user device based upon determining a gaze of the user is directed at the first user device, wherein the receiving comprises receiving a device identifier for the first user device, wherein the recognizing the first user input command comprises consulting a device table stored in the cloud device;
    receiving, at the network device, a second user input command recognized as being directed to a second user device based upon determining a gaze of the user is directed at the second user device, wherein the receiving comprises receiving a device identifier for the second user device, wherein the second device is not in proximity to the first device, wherein the recognizing the second user input command comprises consulting the device table stored in the cloud device;
    determining, at the network device, that the first user device and the second user device are to be paired with one another by determining that the first user input command and the second user input command correspond to a pairing command, wherein the determining comprises identifying the first user device using the received device identifier for the first user device and marking the first user device within the network device as a device to be paired and identifying the second user device using the received device identifier for the second user device and marking the second user device within the network device as a device to be paired and determining that the marking of the second user device occurred within a predetermined time frame with respect to the marking of the first user device; and
    pairing, at the network device, the first device with the second device, wherein the pairing comprises transmitting pairing information from the network device to both the first device and the second device.

2. The method of claim 1, wherein at least one of the first user input command and the second user input command comprises a non-touch input command selected from the group consisting of camera based gesture and audio input.

3. The method of claim 2, wherein the determining that the first user device and the second user device are to be paired with one another is based on the first user input command and the second user input command being received within a predetermined time.

4. The method of claim 1, wherein the second user input command comprises a repeat of the first command.

5. The method of claim 1, wherein one or more of the first user input command and second user input command comprises a physical gesture other than direct physical contact with an object.

6. The method of claim 5, wherein the physical gesture is selected from the group consisting of: hand movement, hand clapping, eye orientation and eye movement.

7. The method of claim 1, wherein one or more of the first user input command and second user input command comprises an auditory command including a spoken command.

8. The method of claim 1, wherein said pairing comprises:
    measuring an elapsed time between said recognizing of the first user input command and said recognizing of the second user input command; and
    pairing the first device and second device if the elapsed time does not exceed a predetermined time limit.

9. An apparatus, comprising:
    a processor; and
    a memory that stores instructions executable by the processor to:
    receive, at the apparatus comprising a network device comprising a cloud device, a first user input command recognized as being directed to a first user device, wherein to receive comprises receiving a device identifier for the first user device based upon determining a gaze of the user is directed at the first user device, wherein the receiving comprises receiving a device identifier for the first user device, wherein the recognizing the first user input command comprises consulting a device table stored in the cloud device;
    receive, at the network device, a second user input command recognized as being directed to a second user device based upon determining a gaze of the user is directed at the second user device, wherein the receiving comprises receiving a device identifier for the second user device, wherein the second device is not in proximity to the first device, wherein the recognizing the second user input command comprises consulting the device table stored in the cloud device;

determine, at the network device, that the first user device and the second user device are to be paired with one another by determining that the first user input command and the second user input command correspond to a pairing command, wherein the determining comprises identifying the first user device using the received device identifier for the first user device and marking the first user device within the network device as a device to be paired and identifying the second user device using the received device identifier for the second user device and marking the second user device within the network device as a device to be paired and determining that the marking of the second user device occurred within a predetermined time frame with respect to the marking of the first user device; and pair, at the network device, the first device with the second device, wherein the pairing comprises transmitting pairing information from the network device to both the first device and the second device.

10. The apparatus of claim 9, wherein at least one of the first user input command and the second user input command comprises a non-touch input command selected from the group consisting of camera based gesture and audio input.

11. The apparatus of claim 10, wherein the determining that the first user device and the second user device are to be paired with one another is based on the first user input command and the second user input command being received within a predetermined time.

12. The apparatus of claim 9, wherein the second user input command comprises a repeat of the first user input command.

13. The apparatus of claim 9, wherein one or more of the first user input command and second user input command comprises a physical gesture other than direct physical contact with an object.

14. The apparatus of claim 13, wherein the physical gesture is selected from the group consisting of: hand movement, hand clapping, eye orientation and eye movement.

15. The apparatus of claim 9, wherein one or more of the first user input command and second user input command comprises an auditory command including a spoken command.

16. A product, comprising:
a non-signal storage device having code stored therewith, the code being executable by a processor of a network device comprising a cloud device and comprising:
code that receives, at the network device, a first user input command recognized as being directed to a first user device based upon determining a gaze of the user is directed at the first user device, wherein the receiving comprises receiving a device identifier for the first user device, wherein the recognizing the first user input command comprises consulting a device table stored in the cloud device;
code that receives, at the network device, a second user input command recognized as being directed to a second user device based upon determining a gaze of the user is directed at the second user device, wherein the receiving comprises receiving a device identifier for the second user device, wherein the second device is not in proximity to the first device, wherein the recognizing the second user input command comprises consulting the device table stored in the cloud device;
code that determines, at the network device, that the first user device and the second user device are to be paired with one another by determining that the first user input command and the second user input command correspond to a pairing command, wherein the determining comprises identifying the first user device using the received device identifier for the first user device and marking the first user device within the network device as a device to be paired and identifying the second user device using the received device identifier for the second user device and marking the second user device within the network device as a device to be paired and determining that the marking of the second user device occurred within a predetermined time frame with respect to the marking of the first user device; and
code that pairs, at the information handling device, the first device with the second device, wherein the pairing comprises transmitting pairing information from the network device to both the first device and the second device.

* * * * *